United States Patent [19]

Davis

[11] 4,225,201
[45] Sep. 30, 1980

[54] CASSETTE HOLDER

[76] Inventor: Donald J. Davis, Rte. 1, Box 247, Bunkie, La. 71322

[21] Appl. No.: 1,300

[22] Filed: Jan. 5, 1979

[51] Int. Cl.² ............................................. A47F 3/10
[52] U.S. Cl. .................................. 312/125; 312/135; 312/284; 211/4; 211/163
[58] Field of Search .................. 312/9, 10, 11, 12, 13, 312/41, 59, 118, 125, 135, 245, 186, 284, 286, 287; 211/4, 163, 49 R

[56] References Cited

U.S. PATENT DOCUMENTS

| 763,291 | 6/1904 | Klayman | 312/125 |
|---|---|---|---|
| 1,029,231 | 6/1912 | Ryan | 312/284 |
| 1,755,477 | 4/1930 | Hunyady | 211/163 |
| 1,873,140 | 8/1932 | McGaugh | 312/118 |
| 2,512,465 | 6/1950 | Moorhouse | 312/125 |
| 2,574,164 | 11/1951 | Baay | 312/125 |
| 3,297,372 | 1/1967 | Brader | 211/163 |
| 4,014,437 | 3/1977 | Rumble et al. | 211/4 |
| 4,026,417 | 5/1977 | Streim et al. | 211/163 |
| 4,126,366 | 11/1978 | Handler et al. | 312/125 |
| 4,132,457 | 1/1979 | Parrish et al. | 312/284 |

Primary Examiner—Victor N. Sakran
Attorney, Agent, or Firm—Edgar E. Spielman, Jr.; David L. Ray

[57] ABSTRACT

A lighted cassette holder for displaying and protecting cassettes is disclosed. The cassette holder features a plurality of cassette holding tracks which are diagonally convergent. The tracks are held by a support member which is attached to a base and a top plate. Electrical lighting is provided adjacent the top plate. Movable dust shields are mounted between the base and top plate to protect the cassettes from dust accumulation.

8 Claims, 4 Drawing Figures

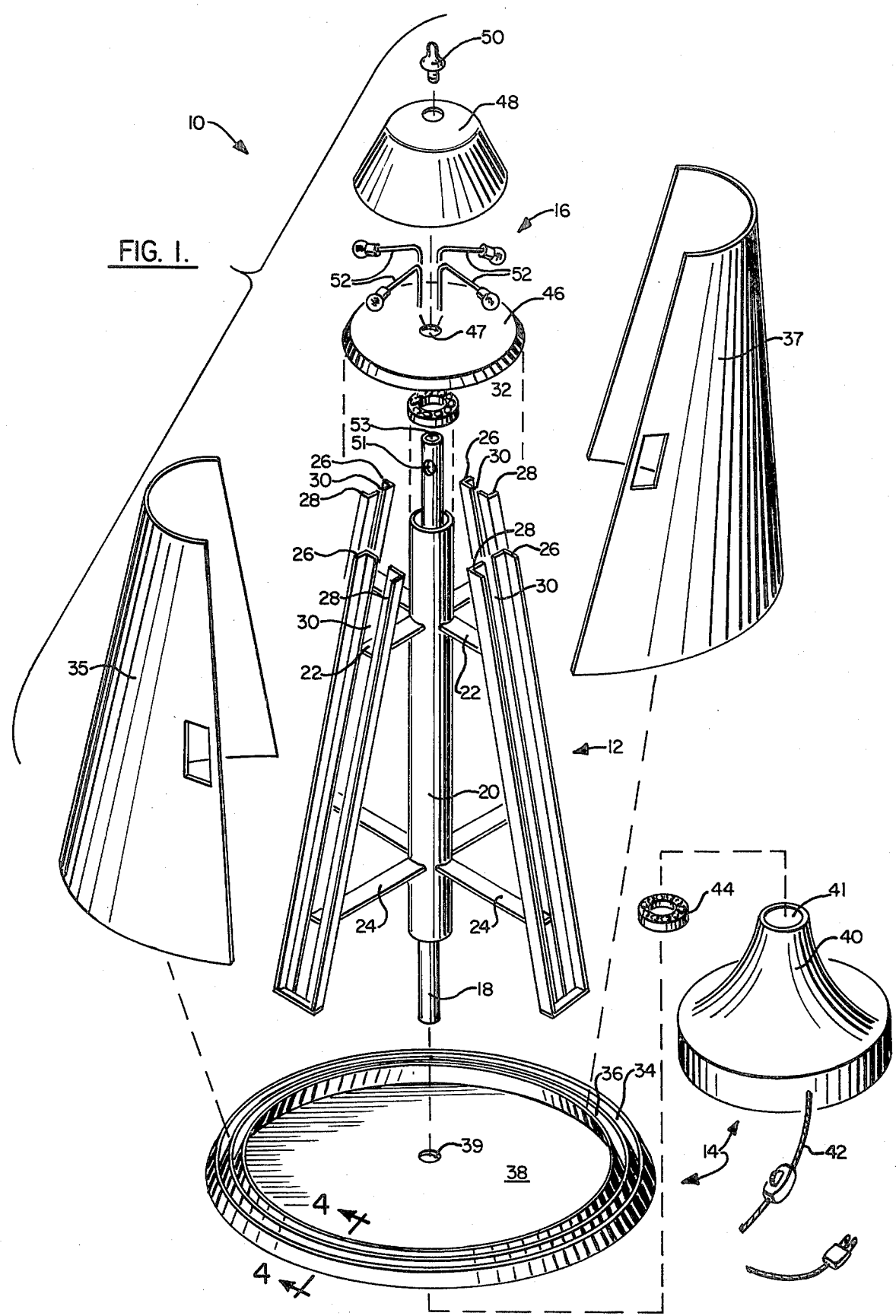

CASSETTE HOLDER

BACKGROUND OF THE INVENTION

The utilization of magnetic tape for the reproduction of sound in stereo systems has become increasingly popular. These magnetic tapes are most conveniently held in tape cassettes, i.e. rectangular plastic housings which hold the tapes and which are insertable into a cassette player. Storage of the cassetes has presented the audiophile with a problem due to thier small size and configuration which makes conventional stacking of the tapes nearly impossible.

Therefore it is an object of this invention to provide a cassette holder which will enable the user to store the tapes in a neat, orderly fashion and which will enable the user to determine cassette selection due to illumination provided by the cassette holder.

Various U.S. patents have issued on cassette holders and display stands. Exemplary of such are U.S. Pat. No. 770,903; U.S. Pat. No. 716,261; U.S. Pat. No. 1,913,921; U.S. Pat. No. 4,014,437 and U.S. Pat. No. 4,026,417.

THE INVENTION

This invention relates to a cassette holder comprising: a base; a top plate upwardly displaced from the base; a rotatable support means for supporting a plurality of diagonally converging cassette holding tracks which support means is connected to the base and top plate; a pair of dust shields movably mounted in guiding tracks carried by the base and top plate, the dust shields being cooperable to complete substantial enclosure of the cassettes; and light means connected to the support means for illuminating the cassette holder.

Preferably, the cassette holding means will each comprise a pair of opposed, elongated, right angle strips as is shown in the accompanying drawings. Esthetically, the cassette holder of this invention can be made very pleasant to the eye by providing a circular base and a circular top plate with the circular top plate having a diameter substantially less than the base plate. By having this dissimilarity in diameter between the base and top plate, the dust shields can be designed to provide the cassette holder with a cone-like appearance.

These and other features of this invention contributing to convenience in use and economy in manufacture will be more fully understood when taken in connection with the following description of a preferred embodiment of the invention and the accompanying drawings in which identical numerals refer to identical parts and in which:

FIG. 1 is an exploded view of a cassette holder of this invention;

Figure 3:
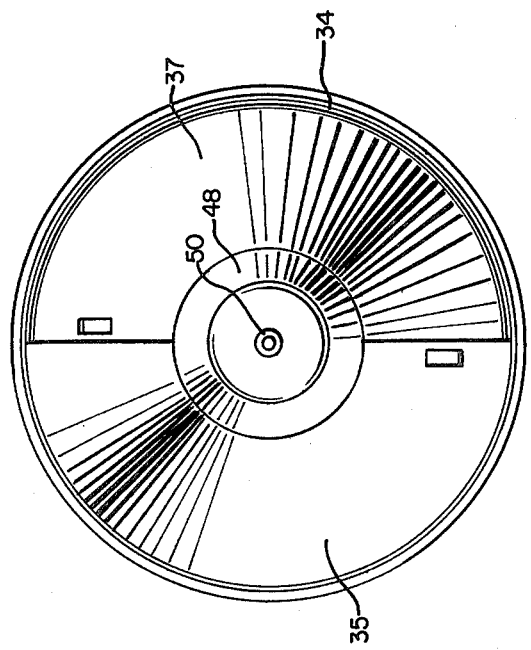
FIG. 3 is a top plan view of the cassette holder shown in FIG. 1.
Figure 4:
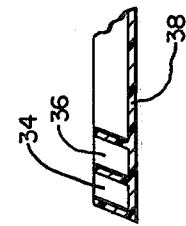
FIG. 4 is a partial, enlarged view of the guiding tracks shown in FIG. 1.
Figure 2:
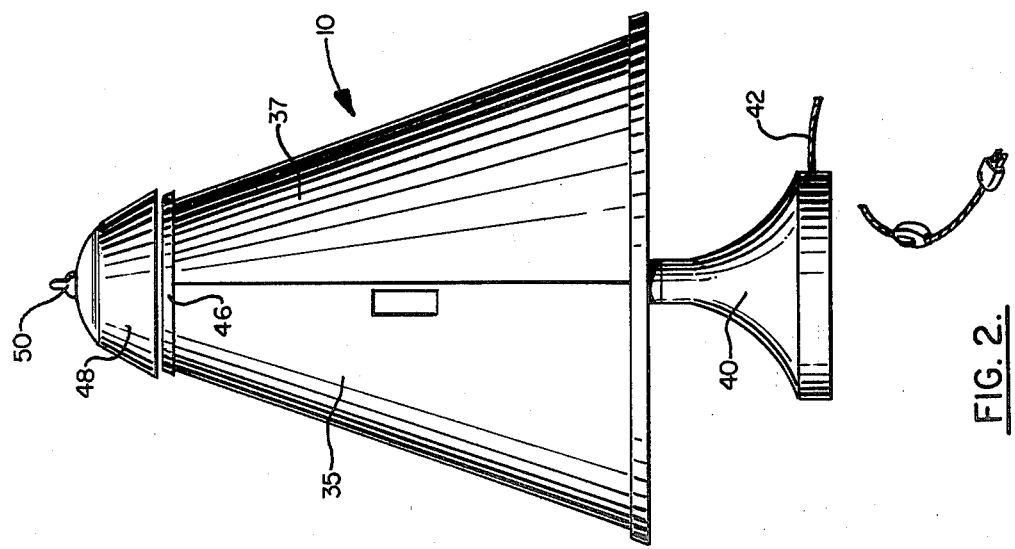
FIG. 2 is a side elevational view of the cassette holder shown in FIG. 1.

Referring now to the drawings, it can be seen that a cassette holder of this invention, generally designated by the numeral 10, has a base structure, generally designated by the numeral 14, a cassette holding structure, generally designated by the numeral 12, and lighting generally designated by the numeral 16.

Base structure 14 comprises a pedestal 40 having a hollow bore 41. Fitted about hollow bore 41 is ball bearing 44. An electrical cord 42 with switch is provided, which cord will thread throguh bore 41 upward through cassette holding structure 12 to communicate electricity to lighting 16. Adapted for mounting atop pedestal 40 there is base plate 38. As can be seen in the drawings, base plate 38 is circular and has at its center aperture 39 which, when base plate 38 is mounted to pedestal 40, will be concentric with bore 41. Aperture 39 will be utilized for passage of electrical cord 42.

Cassette holding structure 12 has a rotatable support for carrying cassette holding tracks 30. This support has at its core a fixed axle 18 which is mounted rigidly inside of pedestal 40 by means of welding, bolting or force fitting. Fixed axle 18 is hollow as can be seen in FIG. 1, for the passage of cord 42. At the upper end of fixed axle 18 is aperture 57 for passage of cord 42. Surrounding and coaxial with fixed axle 18 is rotating axle 20. Rotating axle 20 is attached to ball bearings 44 and 32 which bearings fit around fixed axle 18. By having rotating axle 20 attached to these bearings, easy rotation of axle 20 is insured. Extending radially from axle 20 are lower support arms 24 and upper support arms 22, as can be seen in FIG. 1. These support arms, along with axle 20, are used to support cassette holding tracks 30. In the embodiment shown in the drawings, four tracks are shown which are equiangularly spaced and are positioned so as to be diagonally convergent. It is to be understood, however, that more or less cassette holding tracks may be utilized provided sufficient room is provided.

Cassette holding tracks 30 are designed to hold the cassettes in a stacked fashion so that the cassette titles are easily readable and so that the maximum number of cassettes can be stored in cassette holder 10. Each of the cassette holding tracks, for the embodiment shown, is made of a pair of opposed, elongated, right angle strips 26 and 28. These strips may be either of metal or plastic as desired.

Dust shields 35 and 37 have a configuration to insure that the cassettes stored in cassette holding tracks 30 are substantially completely enclosed. Dust shields 35 and 37, for the embodiment shown, have the configuration of a truncated cone halved along its long axis. Of course, when dust shields 35 and 37 are utilized jointly, they will provide a frusto-conical shape. At their lower ends dust shields 35 and 37 are mounted within channels 34 and 36 carried by base plate 38. As can be seen, these channels are concentric and are located near the periphery of base plate 38. At their uppermost ends, dust shields 35 and 37 will ride inside a pair of concentric channels (not shown) which are carried by top plate 46 are of similar construction as channels 34 and 36. These tracks are located adjacent the periphery of top plate 46. Preferably dust shields 35 and 37 are made of transparent thermoplastic material which is readily available in the marketplace.

Top plate 46 is rigidly attached to axle 18. As can be seen in the drawings, top plate 46 is of a diameter substantially smaller than base plate 38. There is provided aperture 57 in the center of top plate 46 for passage of cord 42 to communicate electricity to electric light bulbs 52 which make up lighting 16. There is also provided, in the embodiment shown, light shade 48 which is attached to axle 18 by screwing light shade screw 50 to screw bore 53 which is located at the uppermost extent of axle 18.

The cassette holder of this invention can be made of any conventional material or a combination of materials. The only requirement being that the material from which the various components are made is sufficiently strong to perform its function. For example, axle 18 is preferably of metal since it must withstand abuse in use. Ball bearings 44 and 32, of course, are conventional ball bearings and will be made of materials conventional for such bearings. All attachments shown in the drawings can be made by either welding or screwing. Some components may be made together in a unitary piece, such as axle 20 and support arms 22 and 24 which may be made in a single integral piece by injection molding, if these parts are of a thermoplastic material.

What is claimed is:

1. A cassette holder comprising:
   a. a base;
   b. a fixed top plate upwardly displaced from said base, said top plate being connected to said base by an elongated, non-rotating axle;
   c. a hollow, rotatable support means concentrically and rotatably mounted over said axle for supporting a plurality of diagonally converging cassette holding tracks;
   d. a pair of dust shields movably mounted in guiding tracks carried by said base and said fixed top plate, said dust shields being cooperable to complete substantial enclosure of said cassettes; and
   e. light means connected to said axle for illuminating said cassette holder.

2. The cassette holder of claim 1 wherein said cassette holding tracks comprises a pair of opposed, elongated, right angle strips.

3. The cassette of claim 1 wherein said base and said top plate are circular and said guiding tracks are a first and second pair of concentric channels, said first pair carried by said base and said second pair carried by said top plate, said guiding track being positioned adjacent the periphery of said base and said top plate.

4. The cassette holder of claim 1 wherein said lighting means comprises a plurality of electrical lights adjacent said top plate.

5. The cassette holder of claim 1 wherein said dust shields are made of transparent plastic.

6. The cassette holder of claim 1 wherein said cassette holding tracks are equiangularly spaced.

7. The cassette holder of claim 6 wherein there are four cassette holding tracks.

8. The cassette holder of claim 7 wherein said cassette holding means comprises a pair of opposed, elongated, right angle strips; said base and said top plate are circular and said guiding tracks are a first and second pair of concentric channels, said first pair carried by said base and said second pair carried by said top plate, said guiding track being positioned adjacent the periphery of said base and said top plate; said lighting means comprises a plurality of electric lights adjacent said top plate; and said dust shields are made of transparent plastic.

* * * * *